(12) United States Patent
McKinley et al.

(10) Patent No.: US 7,451,216 B2
(45) Date of Patent: Nov. 11, 2008

(54) CONTENT INTELLIGENT NETWORK RECOGNITION SYSTEM AND METHOD

(75) Inventors: William Gary McKinley, Wylie, TX (US); Jerry Wayne Dillard, Garland, TX (US)

(73) Assignee: Invision Networks, Inc., Dallas, TX (US)

( * ) Notice: Subject to any disclaimer, the term of this patent is extended or adjusted under 35 U.S.C. 154(b) by 1071 days.

(21) Appl. No.: 10/171,917

(22) Filed: Jun. 14, 2002

(65) Prior Publication Data

US 2002/0191549 A1    Dec. 19, 2002

Related U.S. Application Data

(60) Provisional application No. 60/298,727, filed on Jun. 14, 2001.

(51) Int. Cl.
    *G06F 15/173* (2006.01)
(52) U.S. Cl. .......................... 709/225; 709/223; 709/224
(58) Field of Classification Search ......... 709/223–226, 709/230–237; 370/394–401
    See application file for complete search history.

(56) References Cited

U.S. PATENT DOCUMENTS

| | | | | |
|---|---|---|---|---|
| 5,453,979 A | | 9/1995 | Schibler et al. ............ 370/60.1 |
| 5,724,513 A | | 3/1998 | Ben Nun et al. ........ 395/200.13 |
| 5,740,173 A | * | 4/1998 | Fiorini ......................... 370/394 |
| 5,745,489 A | | 4/1998 | Diaz et al. ................... 370/395 |
| 5,870,628 A | | 2/1999 | Chen et al. ................... 395/842 |
| 5,948,067 A | | 9/1999 | Caldara et al. .............. 709/236 |
| 6,023,466 A | * | 2/2000 | Luijten et al. .......... 370/395.31 |
| 6,069,893 A | | 5/2000 | Parruck et al. .............. 370/395 |
| 6,330,229 B1 | * | 12/2001 | Jain et al. .................... 370/256 |
| 6,598,034 B1 | * | 7/2003 | Kloth ........................... 706/47 |
| 6,601,082 B1 | * | 7/2003 | Durham et al. ............. 718/100 |
| 6,611,502 B1 | * | 8/2003 | Seaman ....................... 370/256 |
| 6,680,922 B1 | * | 1/2004 | Jorgensen ................... 370/328 |
| 6,732,170 B2 | * | 5/2004 | Miyake et al. .............. 709/223 |
| 6,751,659 B1 | * | 6/2004 | Fenger et al. ............... 709/223 |
| 6,889,257 B1 | * | 5/2005 | Patel ........................... 709/232 |
| 6,954,925 B1 | * | 10/2005 | Kong .......................... 717/143 |
| 7,002,974 B1 | * | 2/2006 | Deerman et al. ............ 370/401 |

* cited by examiner

*Primary Examiner*—Jason D Cardone
*Assistant Examiner*—Thomas Duong
(74) *Attorney, Agent, or Firm*—Hunton and Williams, LLP

(57) ABSTRACT

A content intelligent network recognition system and method for use in analyzing and evaluating data from a network are provided. The content intelligent network recognition system includes an input interface, a buffer, a rule/policy database, a network processing unit that includes a plurality of processing elements, a state machine, and an output buffer. The input interface receives data from the network and the buffer stores the data. The rule/policy database is configured to store various rules and policies for use analyzing and evaluating the data. The network processing unit includes a plurality of processing elements that may receive a copy of portions of corresponding data stored in the buffer. The processing units use the rule/policy database to analyze the protocol data units to determine an appropriate action. The state machine may initiate action determined by a processing element for portions of the data.

29 Claims, 10 Drawing Sheets

CONTENT INTELLIGENT NETWORK RECOGNITION SYSTEM AND METHOD

CROSS-REFERENCE TO RELATED APPLICATIONS

Pursuant to 35 U.S.C. § 119(e), this application claims the benefit of U.S. Provisional Patent Application No. 60/298,727, entitled Content Intelligent Network Recognition System and Method, filed Jun. 14, 2001, naming William Gary McKinley and Jerry Wayne Dillard, as inventors, which is hereby incorporated by reference for all purposes.

TECHNICAL FIELD OF THE INVENTION

This invention relates in general to the field of data communications and network security and more particularly to a content intelligent network recognition system and method.

BACKGROUND OF THE INVENTION

The significant advances in high-speed data networks and cost reductions in the area of bandwidth availability have provided technical challenges. Many of the same data protection, analysis, filter, evaluation and monitoring problems that existed with lower speed networks have been exacerbated with the data rates of modern high-speed networks. Widespread availability of inexpensive, always-on broadband Internet connections have generated an enormous rise in the need for data protection.

The difficulty of deploying legacy, software-based protection and management applications has escalated from being difficult to almost impossible. Even ASIC-based routers and switches have been unable to implement multiple Access Control Lists ("ACLs") without quickly degrading network performance.

Existing switches, routers, firewalls and other systems have failed to perform at current or projected bandwidth requirements. Switches and routers are expensive, have long development cycles and lack flexibility. Current network appliances, being CPU based, are slow and not scaleable. Software solutions are incapable of meeting the speed requirements and are not easily configurable to requirements.

For this reason, a need exists for an improved content intelligent network appliance that overcomes the disadvantages of prior systems and provides the capabilities to monitor and extract information from modern high-speed data networks.

SUMMARY OF THE INVENTION

The present invention is directed to a content intelligent network recognition system for use in analyzing and evaluating data communicated through a first data network and a second data network. The content intelligent network recognition system includes an input interface, a buffer, a rule/policy database, a network processing unit, a state machine and an output interface.

The input interface is in communication with the first data network and the second data network. The input interface is operable to receive a plurality of protocol data units transmitted from the first data network and the second data network. The buffer is operable to receive and store the plurality of protocol data units provided through the input interface from the first data network and the second data network.

The rule/policy database is configured to store rules and policies used in analyzing and evaluating the plurality of protocol data units. The network processing unit includes a plurality of processing elements. Each processing element is operable to receive a copy of at least a portion of a protocol data unit from the plurality of protocol data units stored in the buffer. The plurality processing elements also analyzes and evaluates the copy of at least a portion of the protocol data unit using the rules and policies of the rule/policy database to determine an action.

The state machine is operable to track the relative order that the plurality of protocol data units transmitted from the first data network and the second data network are received. The state machine is futher operable to initiate an action on a protocol data unit stored in the buffer as determined by the processing element of the network processing unit that analyzed and evaluated the copy of at least a portion of the protocol data unit stored in the buffer.

The output interface is in communication with the first data network and the second data network. The output interface is operable to communicate the plurality of protocol data units stored in the buffer and received from the first data network to the second data network, and to communicate the plurality of protocol data units stored in the buffer and received from the second data network to the first data network.

In another aspect, the present invention is directed to a network processing unit for use in a content intelligent network recognition system in communication with a data network. The network processing unit including a plurality of processing elements operable to operate in parallel. Each processing element operable to receive at least a portion of a protocol data unit from a plurality of protocol data units that originated from the data network. The processing element further operable to receive at least a portion of a rule/policy database. Each processing element is operable to analyze and evaluate at least the portion of the protocol data unit using the at least a portion of the rule/policy database to determine an action.

In yet another aspect, the present invention is directed to a method for analyzing, evaluating, and acting on protocol data units communicated through a data network. The method includes receiving a plurality of protocol data units from the data network and storing the plurality of protocol data units in a buffer. The method includes copying and storing a portion of each protocol data unit of the plurality of protocol data units to a processing element such that each protocol data unit of the plurality of protocol data units may be associated with a processing element containing the copy of a portion of that protocol data unit.

The method also includes analyzing and evaluating the copy of a portion of each protocol data unit stored at each protocol data unit of the plurality of protocol data units, the analyzing and evaluating using a rule/policy database to determine an action for each protocol data unit.

The method further includes monitoring the state of each protocol data unit of the plurality of protocol data units, monitoring the relative order that the plurality of protocol data units are received from the data network and initiating an action for each protocol data unit.

One advantage of the present invention is the ability to bring analytical capabilities to high-speed data networks without detection or network speed degradation. Another advantage of the present invention, according to one aspect, is the ability to look deep into the content of each data flow that passes through the high-speed network. Another advantage is that the present invention may be easily customized, such that user-defined search may be performed at line-rates on even the fastest gigabit-speed networks. Yet another advantage is the ability of the present invention, according to another aspect, to add, on-the-fly, filters to block or redirect traffic flows that include, for example, computer viruses.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
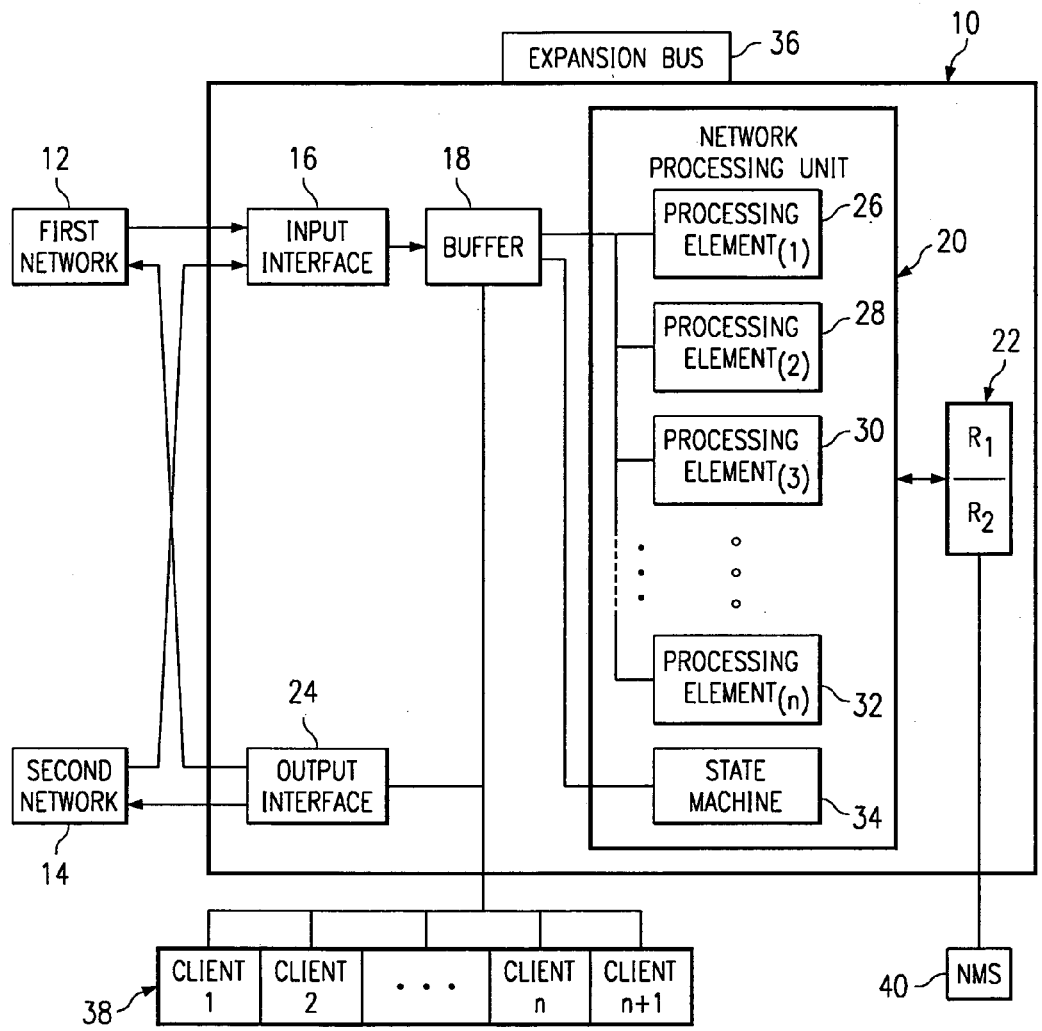
FIG. 1 is a block diagram that illustrates one embodiment of a content intelligent network recognition system.

FIG. 1 is a block diagram of a content intelligent network recognition system 10 for use in analyzing, evaluating and acting on data communicated through a data network, such as the first network 12 and the second network 14, according to an embodiment of the invention. The content intelligent network recognition system 10 may also be used between two different data networks, such as between a private data network and a public data network, to analyze, evaluate, and act upon data exchanged between the two different networks. It will be appreciated that the present invention may also be implemented on a single network as well.

The content intelligent network recognition system 10 may include an input interface 16, a buffer 18, a network processing unit ("NPU") 20, a rule/policy database 22, and an output interface 24. Generally, data is provided from a data network as data units, which are stored at the buffer 18. The NPU 20 may then analyze and evaluate multiple data units in parallel using processing elements and the rule/policy database 22.

The lines connecting such elements as shown in FIG. 1 generally reflect a data bus or possible data paths of this implementation of the content intelligent network recognition system 10. Of course, various control logic or control circuitry may also be provided but is not shown in FIG. 1. This control logic or control circuitry may be implemented using any of a variety of known and available techniques that would be known by one of ordinary skill in the art. For example, a CPU may be used, such as a POWER PC or an INTEL based CPU, to assist with the various control logic of the content intelligent network recognition system 10.

The NPU 20 includes a plurality of Processing Elements ("PEs"), such as a PE 26, a PE 28, a PE 30, and a PE 32, along with a state machine 34. The state machine 34, in other embodiments, may be provided as part of the NPU 20 or separately. The various PEs of the NPU 20 may operate in parallel using instructions or nodes received from the rule/policy database 22 to analyze and process a portion or all of a data unit, which may be generally referred to as a protocol data unit, that originated from either the first network 12 or the second network 14, and which may be copied or, in an alternative embodiment, transferred from the buffer 18 to an available PE of the NPU 20. In a preferred embodiment, the NPU 20 is implemented using a Field Programmable Gate Array ("FPGA") that can be efficiently implemented at a later time as an Application Specific Integrated Circuit ("ASIC"), which may provide performance gains at reduced costs.

The data units that are provided by either the first network 12 or the second network 14 may be referred to as Protocol Data Units ("PDUs") and may include any type of data, such as, for example, an ATM cell, a frame, such as an Ethernet frame, a packet, a datagram, a data slice or any element or unit of data from a data network or based on any user or other defined rules. For example, a PDU may be provided without any protocol whatsoever and may, for example, be provided as pure data, such as from a video data stream.

The state machine 34 may be implemented as one or more state machines. Although the state machine 34 is illustrated in the embodiment of FIG. 1 as part of the NPU 20, in other embodiments, some or all of the state machine 34 may be implemented outside of the NPU 20. The state machine 34, in one embodiment, may be referred to as a time order state machine, and, among other items, the state machine 34 tracks the relative order that the various PDUs are received by the content intelligent network recognition system 10. This information is often needed to determine when to provide a PDU back to a data network in the correct order. For example, assume that a PE determines that a second PDU should be permitted to be communicated to a data network but a first PDU, which was received prior to the second PDU, has not yet completed processing by its PE. In such a case, the state machine 34 would use the relative order such PDUs were received to hold up the communication of the second PDU until a decision was made on the first PDU. As such, the state machine 34 must also have knowledge of the states of the various PEs of the NPU 20. Once this information is known, the state machine 34 may initiate the communication of the PDU to a data network. For example, at the appropriate time, the state machine 34 will initiate the communication of the second PDU stored in the buffer 18 to either the first or second network, depending, in one embodiment, on which network it was received from, through the output interface 24.

A plurality of clients 38 and a network management system 40 are also illustrated in FIG. 1 in communication with the content intelligent network recognition system 10. The plurality of clients 38 may be implemented as one or more computer systems, including a server, that may receive redirected and/or duplicated data from the content intelligent network recognition system 10 for storage or further analysis. For example, the plurality of clients 38 may include an intrusion detection system to perform analysis or to log certain events. In another embodiment, the content intelligent network recognition system 10 of the present invention may be used to provide information to a billing system, which may be implemented as the plurality of clients 38, to provide exact or more accurate billing through counting of the number of data units, and the type of data, transmitted by a particular network customer.

The network management system 40 will, preferably, be implemented as a server that interfaces with the content intelligent network recognition system 10 and is operable to add, delete or revise the rule/policy database 22. The rule/policy database 22 is configured to store rules and policies, which may also be referred to as filters, to analyze the data that is processed by the PEs of the NPU 20. The network management system 40 will, preferably, provide user GUIs or APIs to allow users to create or revise any such rule, policy or filter of the rule/policy database 22.

In a preferred embodiment, these new or revised rules, policies or filters may be implemented in "real-time" or near "real-time" without any interruption in service of the content intelligent network recognition system 10. For example, in one implementation, two rule/policy databases are maintained as illustrated by "$R_1$" and "$R_2$" of the rule/policy database 22 of FIG. 1. One may serve as primary and the other as a backup. Changes and revisions may be made to the backup and once made, the backup may be designated as primary and analysis and evaluation performed by the content intelligent network recognition system 10 will utilize the "new" primary rule/policy database.

In one implementation, this may be achieved without missing one clock cycle of the processing performed by the NPU 20. In effect, the analysis and evaluation performed by the PEs of the NPU 20 are programmable through the rule/policy database 22.

In this manner, the Processing Elements or PE may operate independently and, often in parallel, using the rule/policy database, which may be thought of as containing rules, policies, or filters. The rule/policy database, in one embodiment of the present invention, may be modified or changed "on-the-fly" with minimal or no effect on overall system performance. The policy/rules database shows only one of thousands of possible examples of how data is parsed utilizing possible filters or policies constructable in a non-serial manner. Also, an embodiment of the present invention may use a PCI card to communicate with other or existing systems, such as a client or server application to perform intrusion detection analysis based on information ascertained from the system of the present invention. Of course, in other embodiments, these systems may be implemented as part of the present invention.

The network management system 40, in one implementation, may also provide general management functions to the content intelligent network recognition system 10. This may include such functions as provisioning, maintenance, configuration and control.

The first network 12 and the second network 14 may be any of a variety of known and available data networks and may transmit information in any of a variety of known protocols or formats such as, for example, Asynchronous Transfer Mode ("ATM"), Ethernet, Packet over SONET ("PoS"), and any of a variety of other known or available protocols or formats. The data rate or line rate in which the first network 12 and the second network 14 operate may be any of a variety of data rates, such as, for example, Optical Carrier-level 12 ("OC-12") or Optical Carrier level 48 ("OC-48").

In operation, the content intelligent network recognition system 10 may receive input data from one or more networks, such as the first network 12 and the second network 14, at the input interface 16. The input interface 16 and the output interface 24 may be referred to as a "front end" and a "back end," respectively. These interfaces may provide any needed interfacing, and, in one embodiment, the input interface 16 and the output interface 24 are implemented as connectors to couple with the first network 12 and the second network 14.

The input data is then stored in the buffer 18 as PDUs. If the input data is ATM cells, the present invention may include a cell sorter function, not specifically shown in FIG. 1, that will receive and sort such ATM cells to construct an appropriate PDU that is then stored in the buffer 18. The various PEs of the NPU 20 may then process a copy of a portion or each such PDUs. Once actions are determined, the state machine 34 controls the communication of the PDUs back to an appropriate network and in relative time order that the PDUs were received.

Figure 2:
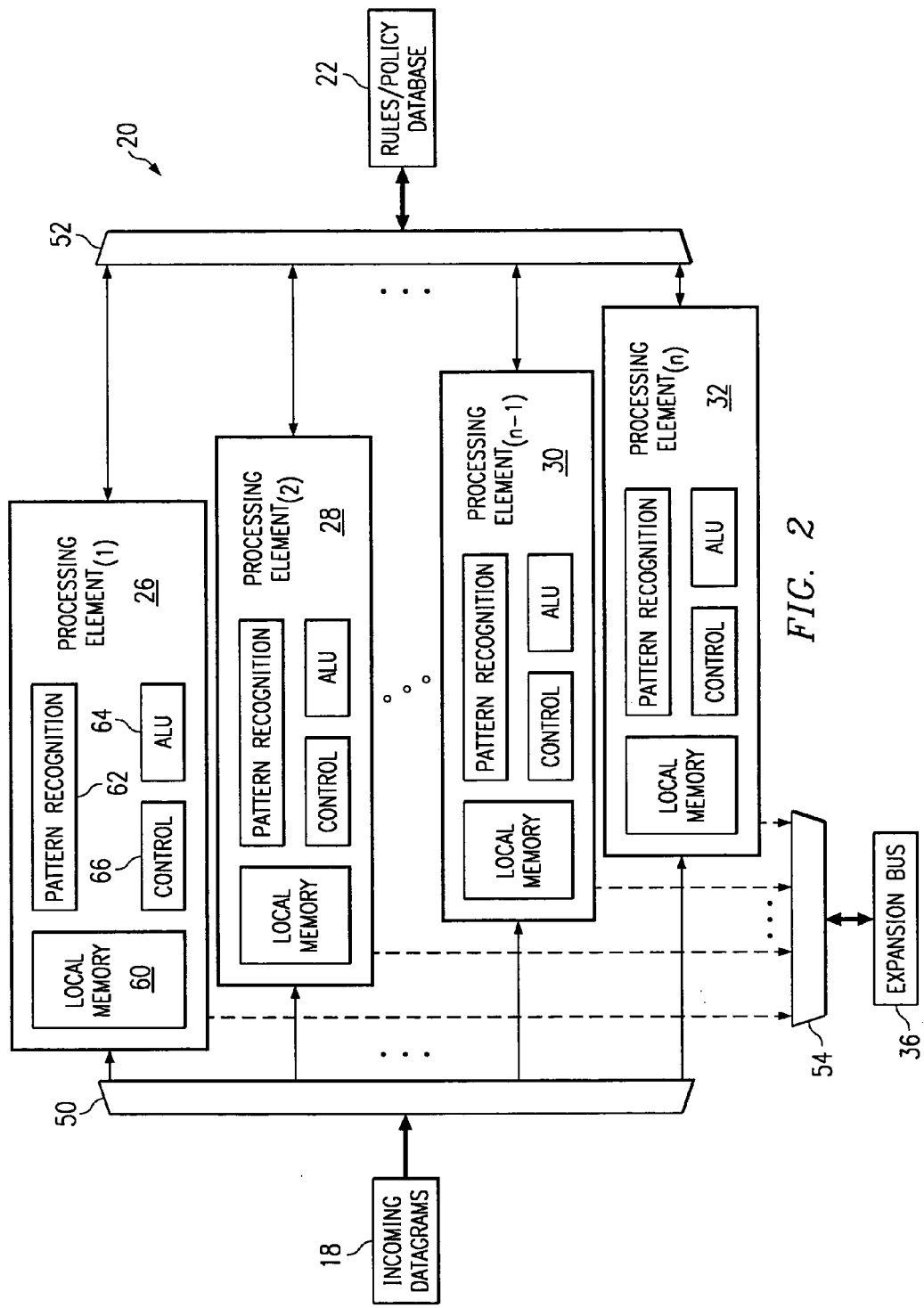
FIG. 2 is a block diagram that illustrates a network processing unit of a content intelligent network recognition system that includes a plurality of processing elements according to an embodiment of the present invention.

FIG. 2 is a block diagram that illustrates the network processing unit 20 of the content intelligent network recognition system 10 that includes a plurality of PEs, according to one embodiment of the present invention. The various PDUs are stored in the buffer 18, which is illustrated in FIG. 2 as incoming datagrams, and may be provided to the plurality of PEs through a multiplexer 50. The plurality of processing elements of NPU 20 may operate in parallel to analyze and evaluate the various PDUs stored in the buffer 18.

In one embodiment, a copy of at least a portion of a particular PDU is provided through the multiplexer 50 to an available PE. For example, assuming that PE 30 becomes available, a copy of at least a portion of a PDU may be provided to the PE 30 through the multiplexer 50. In an alternative embodiment, the entire PDU is transferred through the multiplexer 50 to the PE 30 for processing.

Each of the various PEs operate in parallel and access, in a preferred embodiment, a portion of the rule/policy database 22 through a multiplexer 52. The rules and policies, which may also be referred to as filters, of the rule/policy database 22 may be provided in a tree structure format such that the tree is defined by various nodes.

In such an implementation, the processing element begins at a root node of the rule/policy database 22 and proceeds until an action can be determined. In such a manner, the processing element initially uses the root node, obtained from the rule/policy database 22 through the multiplexer 52, to process the PDU that has been stored in a local memory at a particular PE. As processing proceeds, additional nodes are retrieved as the tree structure of the rule/policy database 22 is traversed. At some point, processing will stop and an action will have been determined. As mentioned above, an action may be virtually anything, such as, for example, a permit, a deny, a redirect, a duplicate, an SNMT trap, or any other defined action.

Once an action has been determined, a state machine, such as the state machine 34 of FIG. 1, will be made aware of such action and the processing element will then become available to process another copy of a PDU, such as a portion of a PDU stored in the buffer 18. The state machine 34 will also be aware of the relative order in which the various PDUs were received from a data network to the content intelligent network recognition system 10.

This information is significant to prevent later arriving PDUs that have completed processing in a PE from being sent out to a data network before earlier arriving PDUs that are still being processed in a PE and the rule/policy database 22. This may occur if an earlier PDU has to traverse further down the tree structure of the rule/policy database 22. In such a case, more nodes must be provided from the rule/policy database 22 to the processing elements such that additional analysis and evaluation is being performed by the pertinent PE.

An expansion bus 36 is shown in FIG. 2 which is coupled to the plurality of PEs through a multiplexer 54. In another implementation, parallel NPUs may be provided through an expansion bus similar to the expansion bus 36. In this manner, faster data rates or line rates may be processed using the content intelligent network recognition system 10 of the present invention because even more processing elements will be operating in parallel to more quickly process the faster data rates.

Focusing now on the PE 26, an illustrative implementation of a PE is shown. The PE 26 includes a local memory 60, a pattern recognition logic 62, an ALU 64, and a control logic 66. In this embodiment, the portion or the entire PDU is stored in the local memory 60 while a node or portion of the rule/policy database 22 is provided to the pattern recognition logic 62. In this manner, the pattern recognition logic 62 performs analysis and evaluation as determined by the portion or node of the rule/policy database 22 that has just been provided. At some point, the pattern recognition logic 62 will result in an action being determined. Of course, it may have to process several portions or nodes of the rule/policy database 22 until such an action may be determined.

At such point, in one embodiment, a handle is generated that includes the action to be generated and this information may be provided to a state machine of the content intelligent network recognition system 10 of the present invention. The control logic 66 and the ALU 64 may be provided in other embodiments to provide, respectively, control logic for the operation of the PE and the capability to perform arithmetic operations on the data stored in the local memory 60.

It can be seen that another advantage of the present invention is the independence of the control path and the data path of an embodiment of a content intelligent network recognition system 10, along with the absence of any (or significant) CPU intervention in the data path or data flow.

Figure 3:
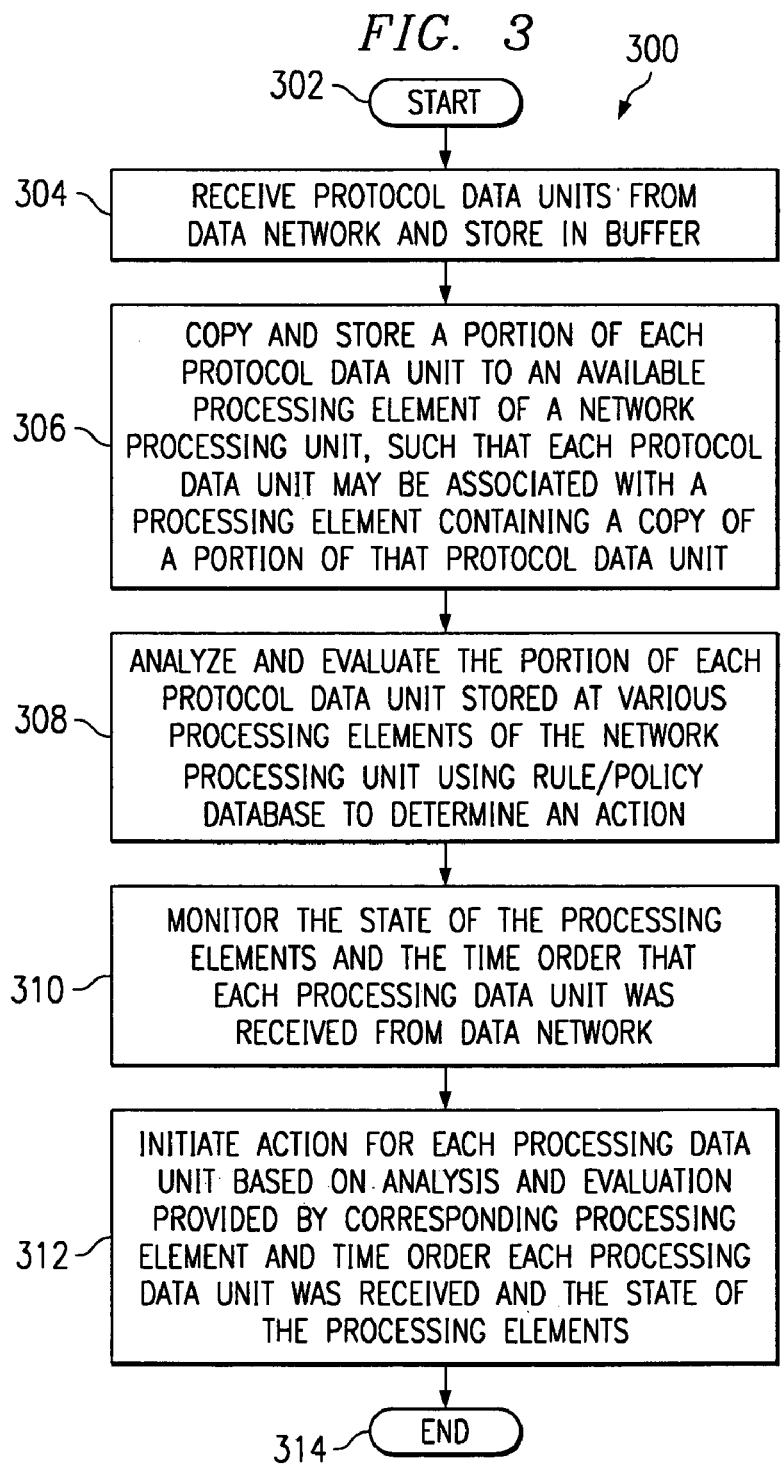
FIG. 3 is a flowchart that illustrates a method for analyzing, evaluating, and acting on protocol data units communicated through a data network.

FIG. 3 is a flowchart that illustrates a method 300 for analyzing, evaluating, and acting on protocol data units communicated through a data network. The method 300 begins at start block 302 and proceeds to block 304. At block 304, one or more PDUs are received from one or more data networks. As mentioned previously, PDUs may be provided as any type of data. For example, a PDU may be an ATM cell, a frame, such as an Ethernet frame, a packet, a datagram, a data slice or any element or unit of data from a data network. For example, a PDU may be provided without any protocol whatsoever and may, for example, be provided as pure data, such as from a video data stream.

Once received, the PDUs are stored in a buffer. The buffer may be any available storage device, storage area, cache, or memory. The method 300 proceeds to block 306 where a portion, segment, or even all (hereinafter collectively referred to as a "portion") of one or more of the PDUs stored in the buffer are copied and stored at an available PE of an NPU. This is done in such a manner that each of the plurality of PEs may proceed in parallel with analyzing and evaluating the portion of the PDU copied from the buffer. Each processing element that is processing a copy of the portion of the PDU (which, in one embodiment, could be a copy of an entire PDU) may be associated with its corresponding PDU that is stored in the buffer.

At block 308, the various PEs analyze and evaluate the portion of the PDU that has been copied to each such PE. This may be performed using a rule/policy database so that ultimately an action, which may be an inaction, is determined. This action may be any of a variety of actions such as, for example, to redirect and/or duplicate the PDU to a client or other system to perform further analysis on such PDU, to permit the transmission of the PDU through the data network (or through a second network), to deny the further transmission of the PDU in the data network, to duplicate the PDU, to generate a Simple Network Management Protocol ("SNMP") trap, and other desired actions or any of a variety of combinations thereof.

In one embodiment, the action that is determined by a PE results in a "handle" being generated. The "handle" may be provided as a value that corresponds to the action determined by the PE. The "handle" information may be used by other processes or elements of the present invention. Each of the PEs may include a local memory or buffer to store the copy of the portion of the PDU, pattern recognition logic to use the rule/policy database to determine the action to be taken, various control logic or circuitry, and an Arithmetic Logic Unit ("ALU"), which may be used to perform various arithmetic operations on the copy of the portion of the PDU at the PE.

The rule/policy database may be implemented using any of a variety of architectures. In a preferred embodiment, the rule/policy database is provided as a $2^n$-way tree structure that contains various binary nodes that may be used by the PEs to analyze and evaluate the copy of the portion of the PDU. For example, a $2^4$-way tree structure may operate on 4 bits, which may be referred to as a nibble, at a time as defined by the nodes of such a tree structure. This may provide the significant advantage of allowing only a portion of the rule/policy database to be traversed before an action is determined. In one embodiment, this considerable technical advantage may save precious clock cycles and further increases the efficiency and speed of the content intelligent network recognition system.

The method 300 proceeds to block 310 where the state of the various PEs are monitored. This may also include the monitoring of the relative time order that each PDU was received from the data network. This information may be used to ensure that the PDUs that are permitted or are determined to be provided back to the data network are provided in the same order that they were received. This may provide the significant advantage of rendering the content intelligent network recognition system 10 transparent to others. This allows PDU analysis and evaluation to proceed without detection.

In addition, the present invention may provide one or more of the following advantages: 1) deep packet inspection (from 512 to 1024 bytes and beyond), 2) transparent to the network (no MAC or IP address needed), 3) high speed design (may be designed, for example, to run initially at 2.5 Gbps), 4) flexible filtering capabilities with no dropped packets, 5) protocol independence (match bit patterns not based on protocols).

At block 310, the monitoring of the state of the PEs and the determination of the time order that each PDU was received from the data network may be achieved using one or more state machines. For example, a time order state machine may be used to track the various times in which the PDUs were received from the data network.

At block 312, an action may be initiated, in one embodiment, by a state machine, for each PDU stored in the buffer. In some cases, the initiation of the action, which was previously determined by the associated PE, will be established based on whether PDUs that were previously received from the data network are still being analyzed and evaluated by any of the plurality of PEs of the NPU. If so, the action for a particular PDU may be delayed and will not be initiated until the earlier received PDUs are analyzed, evaluated, and acted upon. For example, in one embodiment, the action may be to permit the transmission of the PDU to the data network. In such a case, the complete PDUs stored in a buffer or memory, such as that discussed above in connection with block 304, may be sent from such buffer or memory to the data network. This PDU will normally be provided to the data network through an output interface or back end. The method 300 proceeds to end block 314 where the method concludes.

Figure 4:
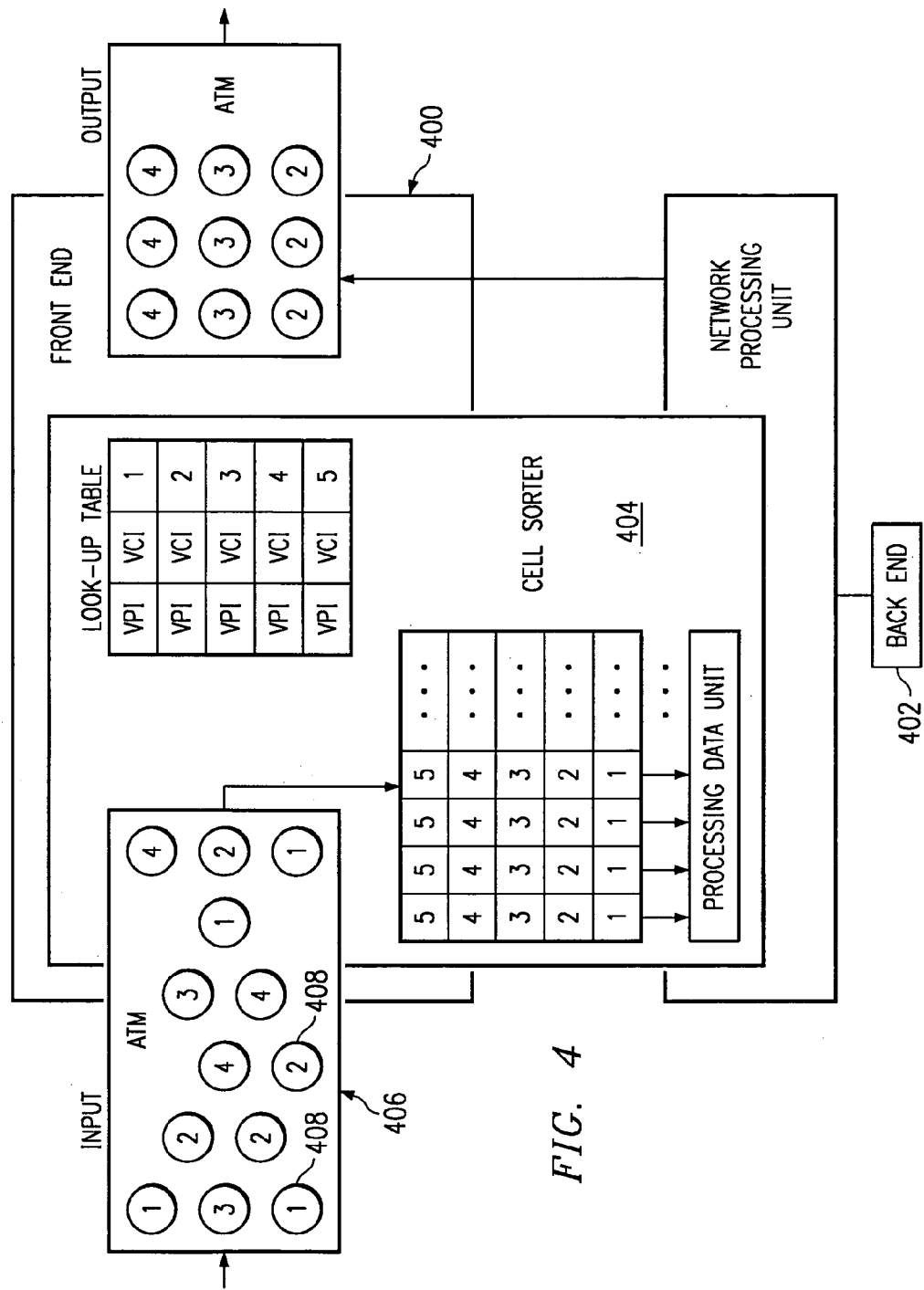
FIG. 4 is a block diagram, according to another aspect, illustrating the present invention having a front end and a back end independent from one another.

FIG. 4 illustrates another embodiment of the present invention having a front end 400 and a back end 402 independent from one another. This may provide for greater flexibility in the design of the present invention allowing for changes to the front end 400 without a change to other elements. Also illustrated is a high-level view of a cell sorter 404 showing how ATM traffic 406 comes in (a chaotic form) unlike Ethernet frame data. The cell sorter 404, according to one embodiment of the present invention, sorts the cells based on their VCI/VPI pair along with the order in which they arrived. This allows for the placement of ATM cells 408 in an associated data unit such that they can be handed down to yet another embodiment of the present invention for analysis and evaluation. This is accomplished at line rates without interrupting overall data network performance.

Figure 5:
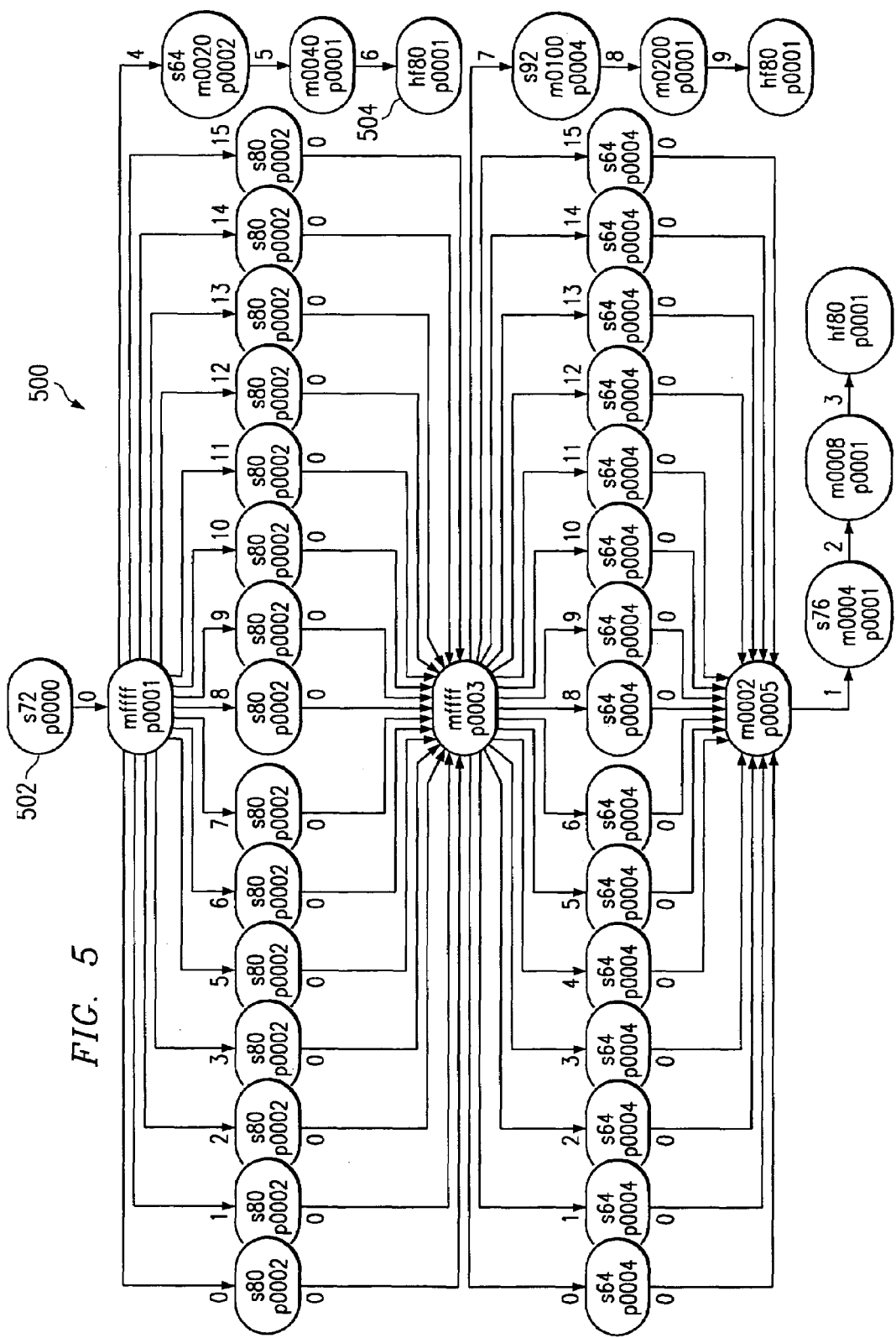
FIG. 5 is a diagrammatic illustration, according to one aspect of the present invention, of a rules/policy database maintained in a tree structure.

FIG. 5 illustrates one aspect of a rule/policy database 500 of the present invention, which may also be referred to as 2$^n$-way tree, a filter database, maintained as a tree structure including three different filters. It should be understood that any number of rules, policies and filters may be used in the present invention.

In one embodiment, the frame, which may be referred to as a protocol data unit, is buffered or cached in memory and, for example, a portion or segment, such as the first 512 bytes of the frame, is copied to a processing element of the network processing unit. A filter may be constructed by a user to evaluate and identify a packet having particular attributes. Each node 502 in the tree structure of the rule/policy database performs a comparison operation on, for example, a nibble of data (4 bits) of the packet. Based upon the value with which the nibble is compared, the filter may take an action or further traverse the tree structure (which may be illustrated as a collection of nodes as shown), for example, one of 16 vectors in this view.

This comparative filtering continues where matches cause it to traverse to the next level in the tree until a leaf node or handle node 504 is reached or until it ends. The disposition or action to be taken on the corresponding packet stored in the buffer or cache, in one embodiment, is reflected by a handle generated at the processing element, which reflects the results of the analysis and evaluation performed by the processing element on the unit or slice of the frame based on the tree structure (or nodes) of the rule/policy database 500. Based upon the determined action, the packet may, for example, be forwarded to a public or private network, or to a downspout port for capture and subsequent analysis or incrementing a counter associated with similar packets.

The filters may be generated utilizing, for example but not limited to, filter specification languages such as BPF, MPF, Pathfinder or PAX. PAX or Pathfinder may be advantageously utilized as generic pattern recognition languages for these purposes. Packet descriptor languages may also be usefully employed to describe the attributes of a packet header or body.

Figure 6:
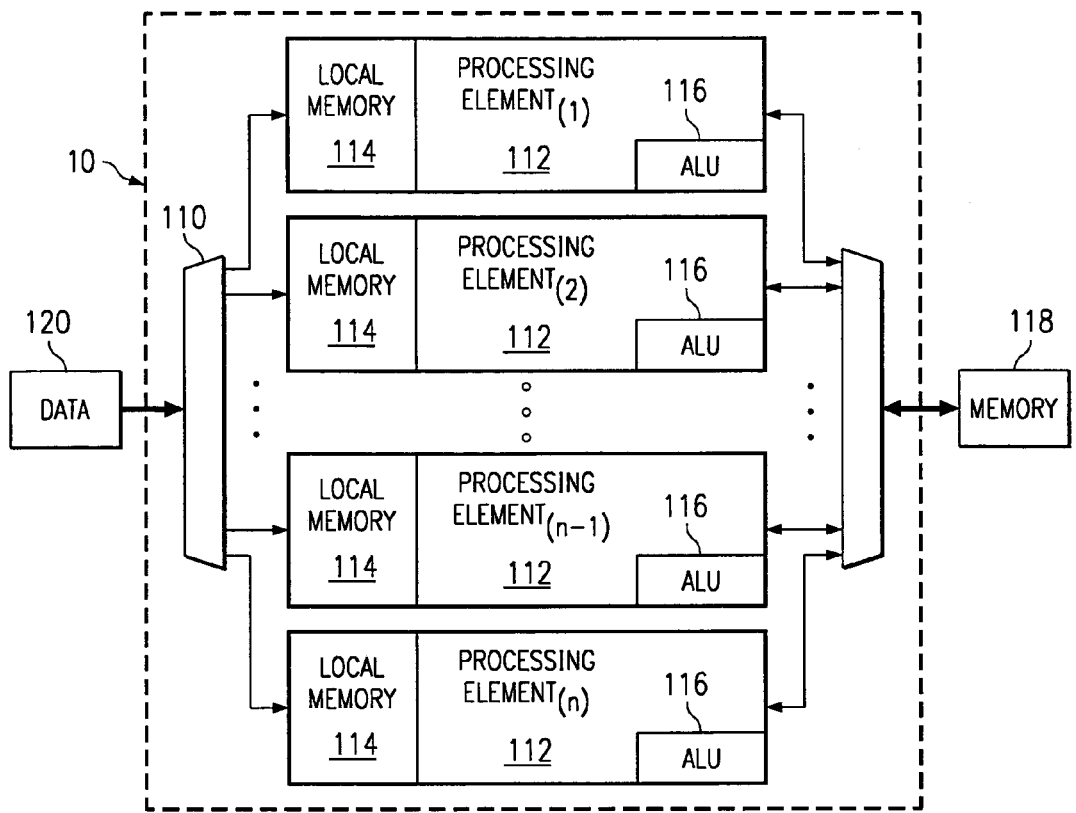
FIG. 6 is a block diagram of another aspect of the present invention of the content intelligent network recognition system.
Figure 7:
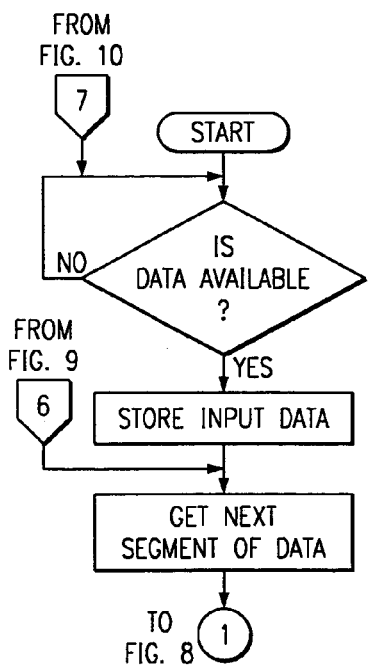
FIG. 7 is a high-level flow diagram of the control logic of the present invention.
Figure 8:
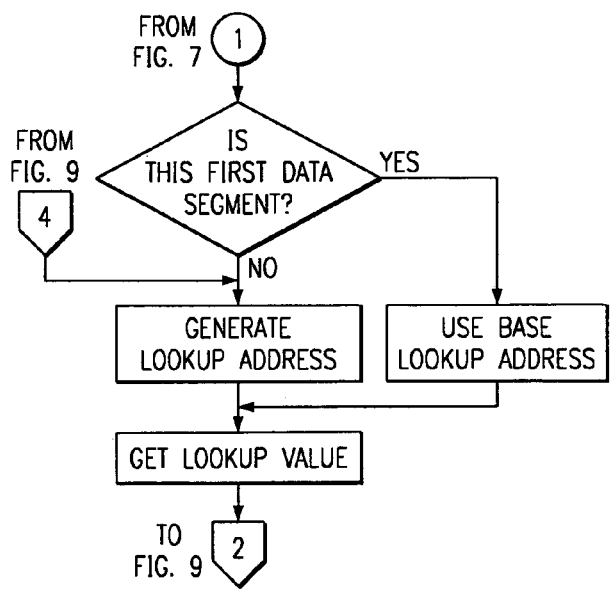
FIG. 8 is another high-level flow diagram of the control logic of the present invention.
Figure 9:
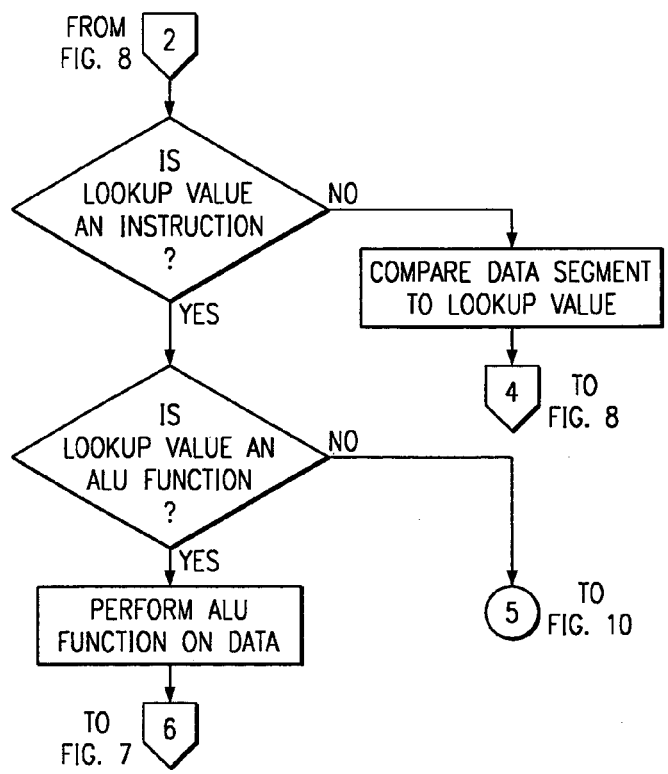
FIG. 9 is another high-level flow diagram of the control logic of the present invention.
Figure 10:
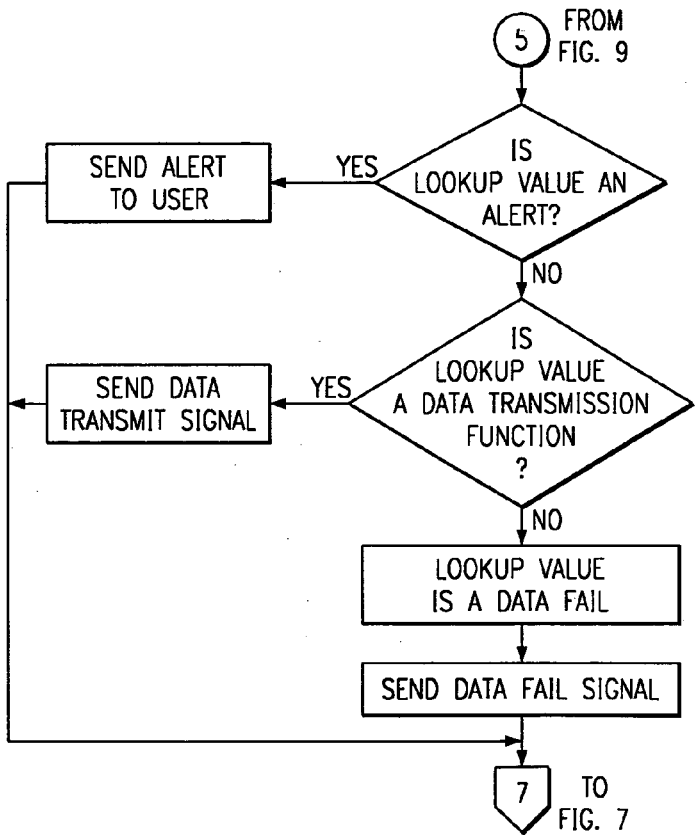
FIG. 10 is another high-level flow diagram of the control logic of the present invention.

FIG. 6 illustrates another aspect of the content intelligent network recognition system 10 of the present invention showing a data input 110 to a plurality of parallel processing elements PE 112, each having a local memory 114 and an individual ALU 116. A memory device 118 is provided which contains the look-up table or tree, and a data input element 120 is also provided.

This implementation requires a Very Low Gate Count ("VLGC") so that the system can be implemented in Very High Density, System Level ("VHDSL") Field Programmable Gate Arrays ("FPGA"). VHDSL FPGAs have achieved a virtual parody on gate count, speed, and I/O standards with ASIC. The content intelligent network recognition system 10 utilizes high speed digital design techniques, data processing algorithms, parallel processing, and pipeline architecture. The parallel operation of the ALU 116 processing and the tree memory device 118 contributes to high speed look-ups and increased system throughput.

FIGS. 7-10 illustrate high-level flow diagrams of the control logic of the present invention. As data becomes available, the data is immediately stored. A segment of the data is then used to start the data analysis process. If the date represents the first segment of the data, a predefined root address is used for the first lookup. If this is not the first segment, then a lookup address is generated from the previous lookup. The lookup value or node is then retrieved from this address and presented to a processing element. If the node is not an instruction, the data segment is compared to the lookup value, and the result is used to generate a new lookup address. If the node is an instruction, the operation code indicated is performed. The available instruction set supports the following operations-datagram examination, point movement, database transversal, ALU functions, flow control, recursiveness, and system directives or actions. After successful completion of the current data segment, the next segment of data is retrieved, and the above defined data analysis process is continued.

Figure 11:
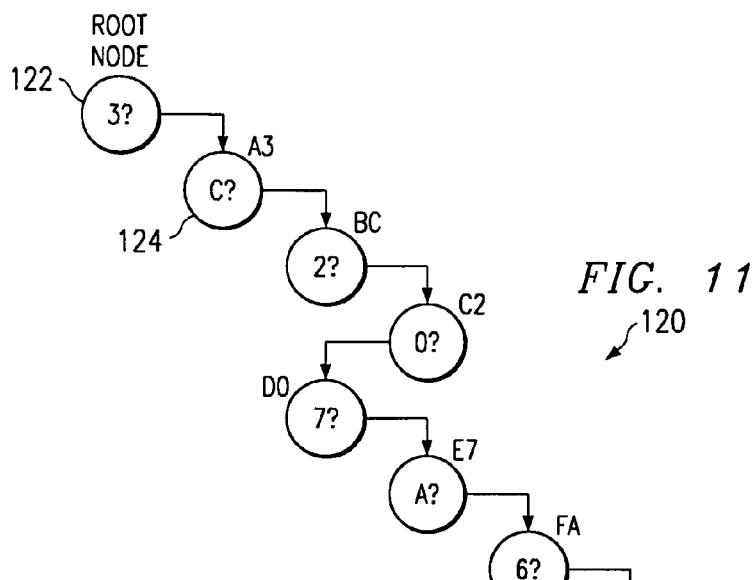
FIG. 11 is a flow-chart illustrating a single 40-bit pattern match according to one aspect.

FIG. 11 illustrates a single 40-bit search object 120 according to one aspect of the present invention. The search object in this example is the hexadecimal value 1496A702C3. Data is received into the content intelligent network recognition system 10 and divided into partial search objects. These search objects are then presented to the lookup tree to determine if a match is present in the database. The first search commences at the root node of the tree. At a block 122, the search object 102 determine whether the bits 0-3 are equal to 3, and in that event, the root node outputs a corresponding arc that causes the execution of node A/3. Where bits 0-3 are not equal to 3, the root node outputs a miss arc, terminating the search. The second search, at a block 124, then checks to see if bits 4-7 are equal to "C". Where the bits equal "IC", node A/3 generates a match arc which causes the execution of node B/C. In the event the bits are not equal to " C", then node A/3 generates a miss arc, terminating the search. This process continues until either a "no match" occurs or there is a match, at a block 126, confirmed at terminal node J/1 results in the end of data analysis by the processing element.

Figure 12:
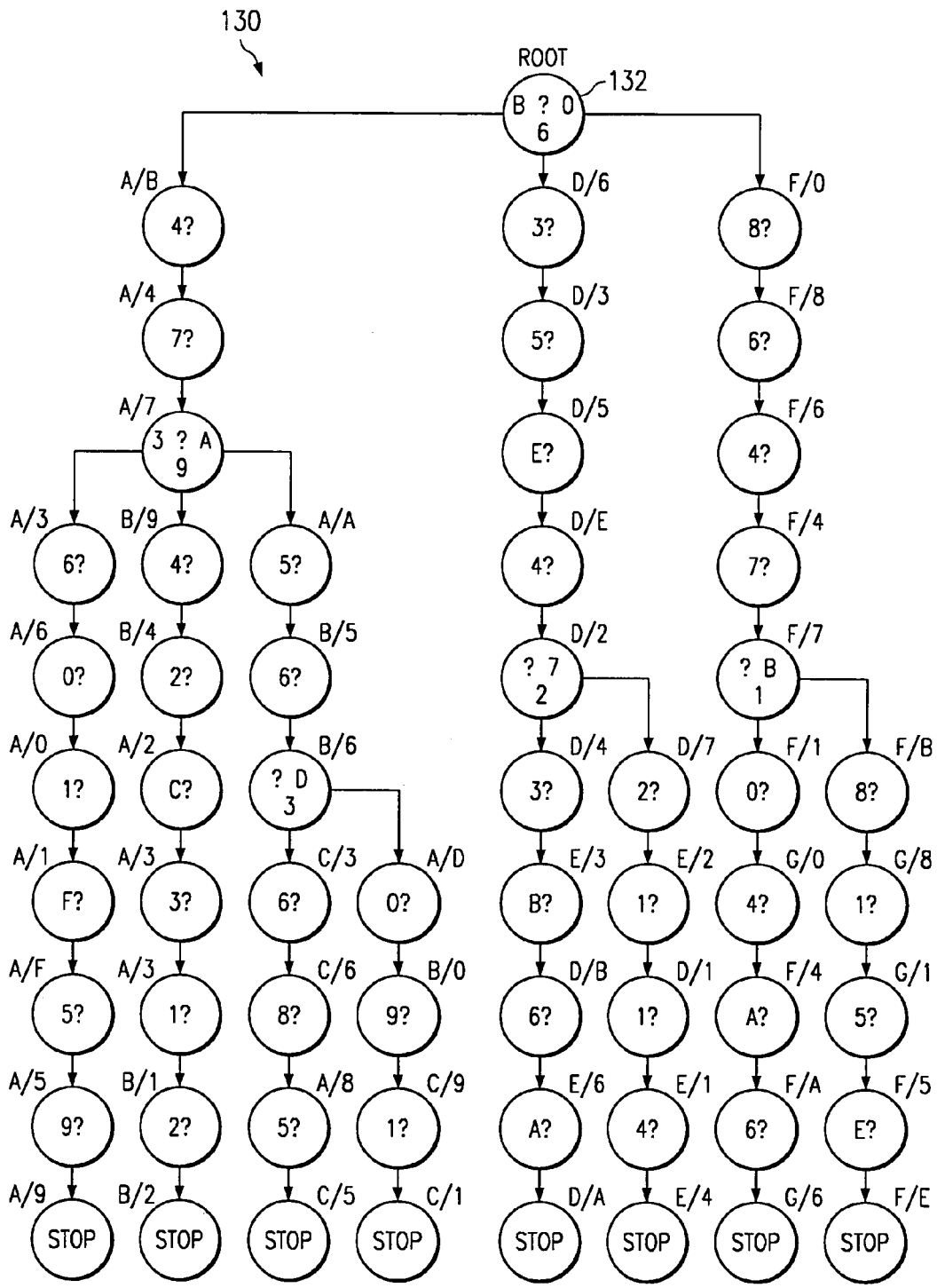
FIG. 12 is a flow-chart illustrating multiple 40-bit pattern search objects, according to one aspect of the present invention.

FIG. 12 illustrates one aspect of a multiple 40-bit search objects 130 for the present invention. The search objects 130 are the hexadecimal values 95F106374B, 213C24974B, 5486365A74B, 190D65A74B, A6B324E536, 411274E536, 32739C2A80, 6A40174680, E518B74680. The root node is executed, at a block 132, and determines if the least significant four bits of the data value match "B", "6", or "0", then the root node outputs a corresponding match arc that triggers the execution of node D/6 or F/0, respectively. This process continues until either a "no match" occurs or there is a match confirmed at one of the terminal nodes. A match at a terminal node results in the end of data analysis by the processing element.

Figure 13:
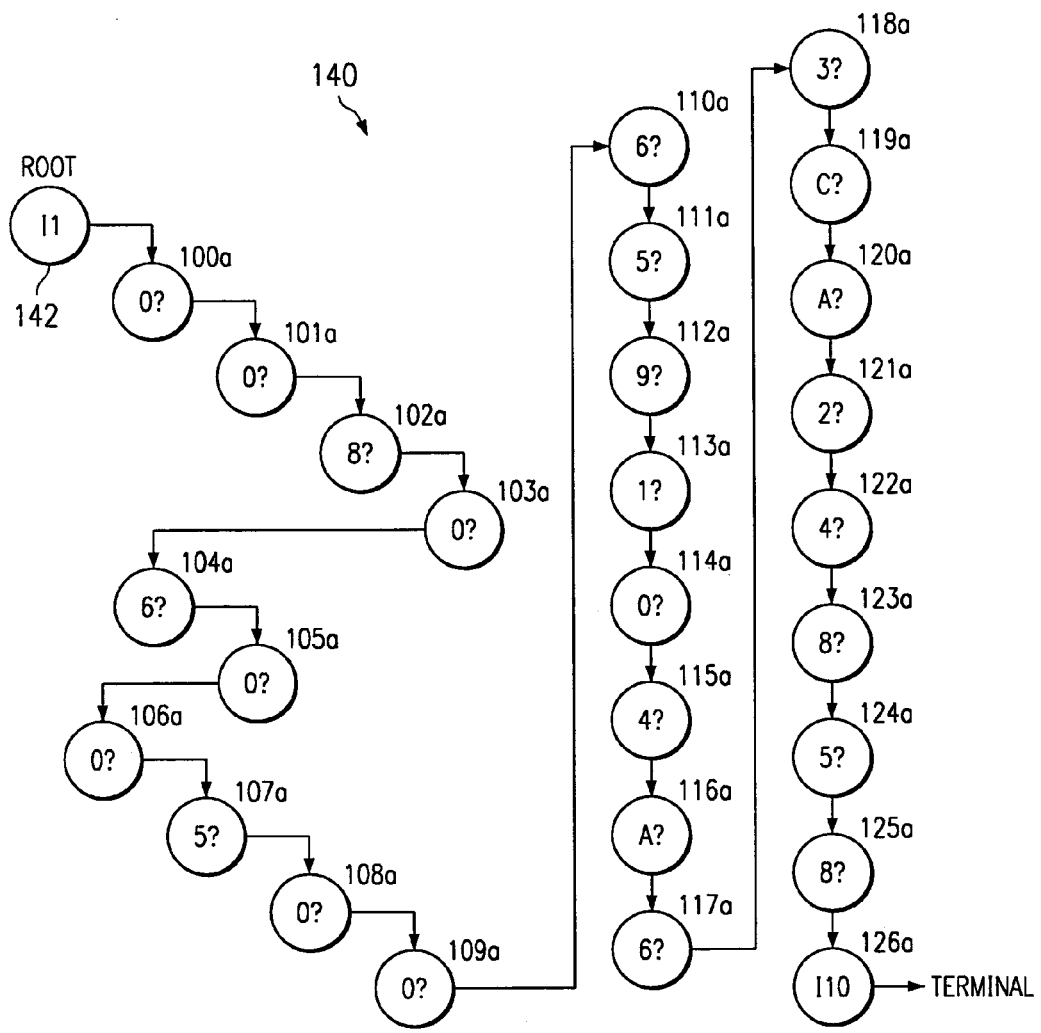
FIG. 13 is a flow chart illustrating instruction type nodes interleaved with data nodes, according to yet another aspect.

FIG. 13 illustrates one aspect of instruction nodes interweaved with data nodes. In the present aspect, the search objects 140 are the following hexadecimal fields: (1) Ethernet Type="0800", (2) IP Protocol="06", (3) TCP Destination Port="0500", (4) IP Source Address="6A401956", and (5) IP Destination Address="05842AC3". At a block 142, the root node is executed and determined to be an instruction node. The process advances the examination point of the datagram forward to the location of the Ethernet Type field. A connecting arc is generated that caused the execution of the next node 100a. Nodes 100a-103a are data nodes that check for a data match of "0800" in the Ethernet Type field. If, at any time, a "no match" occurs, then the process is terminated. A successful match at node 103a indicates that the value "0800" is present in the Ethernet Type field. Node 103a also contains a code that the present invention utilizes to advance the examination point of the datagram forward to the location of the IP Protocol Field.

A connecting arc is produced that triggers the execution of node 104a. Nodes 104a and 105a are data nodes that check for data match of "06" in the IP Protocol Field. If a value of "6" is found in the least four significant bits of the IP Protocol Field, an arc is generated which executes node 105a. A successful match at node 105 indicates that the value "06" is present in the IP Protocol Field. Node 106a also contains a code that advances the examination point of the datagram forward to the location of the TCP Destination Port Field. If a "no match" occurs at node 104a or 105a, the process is terminated.

A connecting arc is produced that triggers the execution of node 106a. Nodes 106a-109a are data nodes that check for a data value of "0050" in the TCP Destination Port Field. If, at any time, a "no match" occurs, then the process is terminated. A successful match at node 109a indicates that the value "0500" is present in the TCP Destination Port Field. Node 109a also contains a code to advance the examination point of the diagram forward to the location of the IP Source Address Field.

A connecting arc is produced that triggers the execution of node 110a. Nodes 110a-117a are data nodes that check for hexadecimal data value of "6A401956" in the IP Source Address Field. If, at any time, a "no match" occurs, then the process is terminated. A successful match at node 117a indicates that the correct value is present in the IP Source Address Field.

A connecting arc is produced that triggers the execution of node 118a. Nodes 118a-125a are data nodes that check for a hexadecimal data value of "85842AC3" in the IP Destination Address Field. If, at any time, a "no match" occurs, then the process is terminated. A successful match at node 125a indicates that the value is present in the IP Destination Address Field and causes the generation of a connecting arc to node 126a. Node 126a is executed and determined to be a terminal instruction node. The execution of the terminal node ends data analysis by the processing element.

Figure 14:
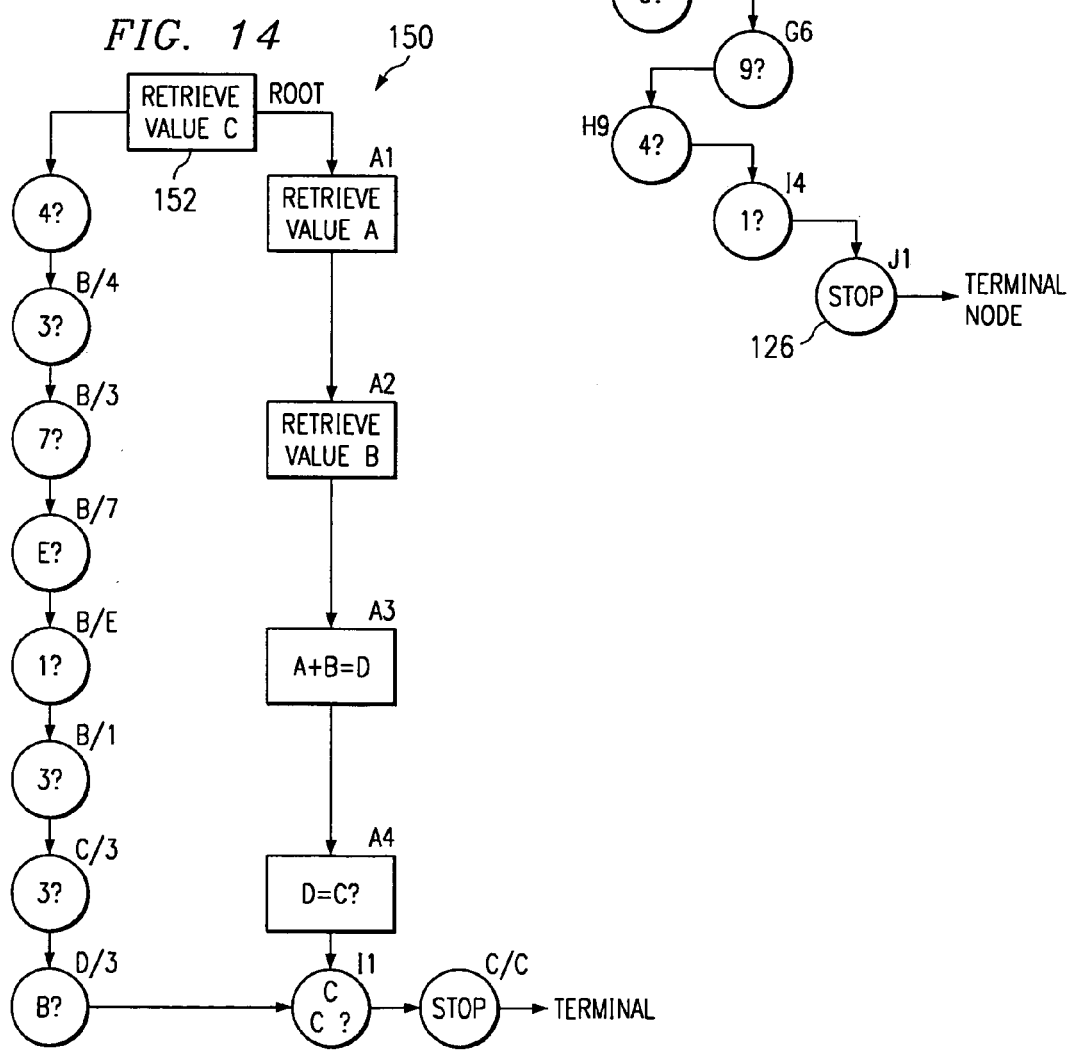
FIG. 14 is diagrammatic illustration of ALU instruction type nodes, which execute in parallel with data nodes, according to another aspect of the present invention.

FIG. 14 illustrates an ALU operation 150 according to one aspect of the present invention that executes in parallel with the data analysis process. In this example, three values represented by the letters A, B, and C, are retrieved from the datagram. Value C is checked to see if it matches the hexadecimal value "B331E734". At the same time, values A and B are added together with the sum being value D. D is checked to see if it matches value C. If C matches "B331E734" and D is equal to C, then there is a successful conclusion to the data matching process. If, at any time during the process, a "no match" occurs, then the process is terminated.

At a block 152, the process begins at the root node which is an instruction to retrieve data value C. Two connecting arcs are generated, one to data node B/0 and one to ALU instruction node A1. Nodes B/0, B/4, B/3, B/7, B/E, B/1, C/3, and D/3 are data nodes which check for a hexadecimal data value of "B331E734" in value C. If, at any time, a "no match" occurs, then the process is terminated. A successful match at node D/3 indicates that value C contains "B331E734", and a connecting arc is generated to instruction node 11.

ALU instruction node A1 executed concurrently with data node B/0. Node A1 contains an instruction to retrieve data value A. A connecting arc is generated to node A2, which contains an instruction to retrieve data value B. A connecting arc is generated to node A3, which contains an instruction to add data value A to data value B and place the sum in data value D. Upon completion of this ALU function, a connecting arc is generated to node A4. Node A4 contains an instruction to check if value D is equal to value C. If value D is equal to value C, then a connecting arc is generated to node 11. If the values are not equal, then the process is terminated.

Node 11 contains an instruction which determines if both paths have generated the connecting arc to 11. If both paths have been completed, then a connecting arc to node C/C is generated. Node C/C is a terminal node which ends the process. If either path fails to complete, then the process is terminated.

Thus, it is apparent that there has been provided, in accordance with the present invention, a content intelligent network recognition system and method that provide significantly improved performance for high-speed data analysis and evaluation and that satisfy one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the techniques, systems, sub-systems, and methods described and illustrated in the preferred embodiment as discrete or separate may be combined or integrated with other systems, modules, techniques, or methods without departing from the scope of the present invention. For example, assuming available memory and adequate performance characteristics, the rule/policy database may be integrated into the NPU instead of being implemented in a separate storage or memory element. Other items shown as directly coupled to each other may be coupled through some other interface or device, such that the items may no longer be considered directly coupled to each other but may still be in communication with one another. Other examples of changes, substitutions, and alterations are readily ascertainable by one skilled in the art and could be made without departing from the spirit and scope of the present invention.

What is claimed is:

1. A content intelligent network recognition system for use in analyzing and evaluating data communicated through a first data network and a second data network, the content intelligent network recognition system comprising:
   an input interface in communication with the first data network and the second data network, the input interface operable to receive a plurality of protocol data units transmitted from the first data network and the second data network;
   a buffer operable to receive and store the plurality of protocol data units provided through the input interface from the first data network and the second data network;
   a rule/policy database configured to store rules and policies used in analyzing and evaluating the plurality of protocol data units;
   a network processing unit that includes a plurality of parallel processing elements, each processing element operable to receive a copy of at least a portion of a protocol data unit from the plurality of protocol data units stored in the buffer, and to analyze and evaluate the copy of at least a portion of the protocol data unit using the rules and policies of the rule/policy database to determine an action, wherein the rule/policy database is organized as a tree structure that includes various nodes, the various nodes provided as a portion of the rule/policy database used by the plurality of parallel processing elements to determine the action;
   a state machine operable to track the relative order that the plurality of protocol data units transmitted from the first data network and the second data network are received, the state machine operable to initiate an action on a protocol data unit stored in the buffer as determined by the processing element of the network processing unit that analyzed and evaluated the copy of at least a portion of the protocol data unit stored in the buffer; and
   an output interface in communication with the first data network and the second data network, the output interface operable to communicate the plurality of protocol data units stored in the buffer and received from the first data network to the second data network, and to communicate the plurality of protocol data units stored in the buffer and received from the second data network to the first data network;
   wherein the first data network and the second data network are portions of the same data network, and the content intelligent network recognition system is provided at a node between the first data network portion and the second data network portion of the same data network.

2. The content intelligent network recognition system of claim 1, wherein the action is an action to permit the transmission of a protocol data unit stored in the buffer that originated from the first data network to the second data network.

3. The content intelligent network recognition system of claim 1, wherein the action is an action to deny the transmission of a protocol data unit stored in the buffer that originated from the first data network to the second data network.

4. The content intelligent network recognition system of claim 1, wherein the action is an action to redirect the transmission of a protocol data unit stored in the buffer that originated from the first data network to a client.

5. The content intelligent network recognition system of claim 1, wherein the action is an action to perform an SNMP trap on the transmission of a protocol data unit stored in the buffer that originated from the first data network to a client.

6. The content intelligent network recognition system of claim 1, wherein the state machine is further operable to monitor the status of the plurality of parallel processing elements of the network processing unit to determine which protocol data units are having a corresponding copy of a portion of themselves analyzed and evaluated by a parallel processing element, the state machine operable to determine when to initiate the action on a protocol data unit stored in the buffer based on whether an earlier received protocol data unit is still having a corresponding copy of a portion of itself analyzed and evaluated by one of the plurality of parallel processing elements.

7. The content intelligent network recognition system of claim 1, wherein the state machine includes a plurality of state machines.

8. The content intelligent network recognition system of claim 1, further comprising:
   a second rule/policy database configured to store various rules and policies to analyze and evaluate the plurality of protocol data units, and wherein each processing element of the network processing unit is operable to receive a copy of at least a portion of a protocol data unit from the plurality of protocol data units stored in the buffer, to analyze and evaluate the copy of at least a portion of the protocol data unit using the rules and policies stored on the second rule/policy database to determine the action.

9. The content intelligent network recognition system of claim 1, wherein the first data network and the second data network are ATM networks.

10. The content intelligent network recognition system of claim 9, further comprising:
    a cell sorter operable to sort the order of ATM cells received from the first data network and the second data network.

11. The content intelligent network recognition system of claim 1, wherein the first data network and the second data network are Ethernet networks.

12. The content intelligent network recognition system of claim 1, wherein the first data network and the second data network are Packet over SONET networks.

13. The content intelligent network recognition system of claim 1, wherein the plurality of protocol data units are provided through an OC-12 based network.

14. The content intelligent network recognition system of claim 1, wherein the plurality of protocol data units are provided through an OC-48 based network.

15. The content intelligent network recognition system of claim 1, wherein the input interface and the output interface are connectors.

16. The content intelligent network recognition system of claim 1, wherein the network processing unit is implemented using a field programmable gate array.

17. The content intelligent network recognition system of claim 1, wherein the network processing unit is implemented using an application specific integrated circuit.

18. The content intelligent network recognition system of claim 1, wherein the first network is a private network and the second network is a public network.

19. The content intelligent network recognition system of claim 1, wherein the plurality of protocol data units are provided in a format selected from a group consisting of a packet, a cell, a frame, and a datagram.

20. A network processing unit for use in a content intelligent network recognition system in communication with a first data network and a second data network, the network processing unit comprising:

an input interface in communication with the first data network and the second data network, the input interface operable to receive a plurality of protocol data units transmitted from the first data network and the second data network; and a plurality of parallel processing elements operable to operate in parallel, each processing element operable to receive at least a portion of a protocol data unit from the plurality of protocol data units that originated from at least one of the first data network and the second data network, and to receive at least a portion of a rule/policy database, each processing element operable to analyze and evaluate at least the portion of the protocol data unit using the at least a portion of the rule/policy database to determine an action, wherein the rule/policy database is organized as a tree structure that includes various nodes, the various nodes provided as the portion of the rule/policy database used by the plurality of parallel processing elements to determine the action;

wherein each processing element of the plurality of parallel processing elements include:
a memory operable to store a copy of at least a portion of the protocol data unit;
a pattern recognition logic operable to analyze and evaluate at least the portion of the protocol data unit stored in the memory using the at least a portion of the rule/policy database to determine the action; and
an arithmetic logic unit operable to perform instructions to perform arithmetic operations on at least the portion of the protocol data unit stored in the memory;

wherein the first data network and the second data network are portions of the same data network, and the content intelligent network recognition system is provided at a node between the first data network portion and the second data network portion of the same data network.

21. The network processing unit of claim 20, further comprising:
a state machine operable to track the relative order that the plurality of protocol data units are received from at least one of the first data network and the second data network, the state machine operable to determine when to initiate the action on a protocol data unit stored in a buffer as determined by the plurality of parallel processing elements of the network processing unit that analyzed and evaluated at least the portion of the protocol data unit stored in the buffer, and as determined by the relative order that the plurality of protocol data units were received.

22. A network processing unit for use in a content intelligent network recognition system in communication with a first data network and a second data network, the network processing unit comprising:
an input interface in communication with the first data network and the second data network, the input interface operable to receive a plurality of protocol data units transmitted from the first data network and the second data network;
wherein the first data network and the second data network are portions of the same data network, and the content intelligent network recognition system is provided at a node between the first data network portion and the second data network portion of the same data network;
a plurality of parallel processing elements operable to operate in parallel, each processing element operable to receive at least a portion of a protocol data unit from a plurality of protocol data units that originated from at least one of the first data network and the second data network, and to receive at least a portion of a rule/policy database, each processing element operable to analyze and evaluate at least the portion of the protocol data unit using the at least a portion of the rule/policy database to determine an action, wherein the rule/policy database is organized as a $2^n$-way tree structure that includes various nodes, the various nodes provided as the portion of the rule/policy database used by the plurality of parallel processing elements to determine the action;

wherein each processing element of the plurality of parallel processing elements include:
a memory operable to store a copy of at least a portion of the protocol data unit;
a pattern recognition logic operable to analyze and evaluate at least the portion of the protocol data unit stored in the memory using the at least a portion of the rule/policy database to determine the action; and
an arithmetic logic unit operable to perform instructions to perform arithmetic operations on at least the portion of a protocol data unit stored in the memory.

23. A method for analyzing, evaluating, and acting on protocol data units communicated through a first data network and a second data network, the method comprising:
establishing a communication with at least one of the first data network and the second data network;
receiving a plurality of protocol data units from at least one of the first data network and the second data network wherein the first data network and the second data network are portions of the same data network, and the content intelligent network recognition system is provided at a node between the first data network portion and the second data network portion of the same data network;
storing the plurality of protocol data units in a buffer;
copying and storing a portion of each protocol data unit of the plurality of protocol data units stored in the buffer to one of a plurality of parallel processing elements such that each protocol data unit of the plurality of protocol data units may be associated with a processing element containing the copy of a portion of that protocol data unit;
analyzing and evaluating the copy of a portion of each protocol data unit stored at its associated processing element, the analyzing and evaluating using a rule/policy database to determine an action for each protocol data unit, wherein the rule/policy database is organized as a tree structure that includes various nodes, the various nodes provided as the portion of the rule/policy database used by the plurality of parallel processing elements to determine the action;
monitoring a state of each protocol data unit of the plurality of protocol data units;
monitoring a relative order that the plurality of protocol data units are received from the data network; and
initiating the action for each protocol data unit.

24. The method of claim 23, wherein the method further includes providing a content intelligent network recognition system comprising:
an input interface in communication with at least one of the first data network and the second data network, the input interface operable to receive the plurality of protocol data units received from at least one of the first data network and the second data network;
the buffer operable to receive and store the plurality of protocol data units provided through the input interface from at least one of the first data network and the second data network;

the rule/policy database configured to store rules and policies used in analyzing and evaluating the plurality of protocol data units;

a network processing unit that includes the plurality of parallel processing elements, each processing element operable to receive the copy of at least a portion of the protocol data unit from the plurality of protocol data units stored in the buffer, and to analyze and evaluate the copy of at least a portion of the protocol data unit using the rules and policies of the rule/policy database to determine the action;

a state machine operable to track the relative order that the plurality of protocol data units transmitted from at least one of the first data network and the second data network are received, the state machine operable to initiate the action on a protocol data unit stored in the buffer as determined by the plurality of parallel processing elements of the network processing unit that analyzed and evaluated the copy of at least a portion of the protocol data unit stored in the buffer; and an output interface in communication with at least one of the first data network and the second data network, the output interface operable to communicate the plurality of protocol data units stored in the buffer and received from at least one of the first data network and the second data network, and to communicate the plurality of protocol data units stored in the buffer and received from at least one of the first data network and the second data network.

25. The method of claim 24, wherein the plurality of parallel processing elements of the network processing unit are further defined as operating in parallel.

26. The method of claim 24, wherein the network processing unit is further defined such that at least one of the plurality of parallel processing elements is coupled to a memory device operable to retain the copy of at least the portion of the protocol data unit and that the at least one of the plurality of parallel processing elements is further coupled to an arithmetic logic unit.

27. The method of claim 26, wherein the plurality of parallel processing elements of the network processing unit operate in parallel to analyze and evaluate the protocol data unit.

28. The method of claim 26, wherein the at least first memory device includes a data lookup table.

29. The method of claim 26, wherein the at least first memory device includes a filter configured in a tree structure.

* * * * *